United States Patent [19]

Buck

[11] 4,343,272
[45] Aug. 10, 1982

[54] DEVICES FOR SUPPLEMENTING CONVENTIONAL LIQUID FUELS IN INTERNAL COMBUSTION ENGINES WITH GASEOUS FUEL SUPPLEMENTS

[76] Inventor: Alan C. Buck, 6073 Nauru St., Cypress, Calif. 90630

[21] Appl. No.: 129,791

[22] Filed: Mar. 12, 1980

[51] Int. Cl.³ ............................................. F02P 13/02
[52] U.S. Cl. ................................. 123/297; 123/169 R; 123/169 EL; 123/143 R
[58] Field of Search ............. 123/297, 169 R, 169 EL, 123/169 PA, 143 R, 143 A, 143 B, 143 C, DIG. 12; 313/120

[56] References Cited

U.S. PATENT DOCUMENTS

| | | |
|---|---|---|
| 642,167 | 1/1900 | Simms . |
| 1,134,537 | 4/1915 | Hutches, Jr. . |
| 1,319,318 | 10/1919 | Bain ..................................... 313/120 |
| 1,672,693 | 6/1928 | Scott ............................. 123/169 R |
| 1,770,608 | 7/1930 | Fischer . |
| 2,034,855 | 3/1936 | Alby . |
| 2,229,063 | 1/1941 | Field . |
| 2,331,912 | 10/1943 | Holthouse, Jr. . |
| 2,432,507 | 12/1947 | Citivarese . |
| 2,509,093 | 5/1950 | Field . |
| 2,625,921 | 1/1953 | Van Ry . |
| 2,937,634 | 5/1960 | Kelseaux et al. ........... 123/DIG. 12 |
| 2,963,104 | 12/1960 | Voelcker . |
| 3,173,409 | 3/1965 | Warren . |
| 3,204,139 | 8/1965 | Candelise . |
| 3,665,902 | 5/1972 | Bloomfield . |
| 3,908,625 | 9/1975 | Romy . |
| 3,980,061 | 9/1976 | McAlister ........................... 123/297 |
| 4,066,046 | 1/1978 | McAlister ........................... 123/297 |
| 4,095,580 | 6/1978 | Murray et al. ..................... 123/297 |
| 4,111,161 | 9/1978 | Ueno et al. ................. 123/DIG. 12 |
| 4,112,875 | 9/1978 | Laumann et al. .......... 123/DIG. 12 |

Primary Examiner—P. S. Lall
Attorney, Agent, or Firm—John J. Byrne

[57] ABSTRACT

Disclosed are several devices for supplementing conventional fuels (liquid or gas) in internal combustion engines with gaseous fuel supplements. The first device contains means for introducing a stream of hydrogen and/or oxygen gas into the spark gap. The second device contains means for introducing a gaseous fuel supplement into the combustion chamber through the piston. The third and fourth devices both contain means for introducing a gaseous fuel supplement into the venturi.

2 Claims, 15 Drawing Figures

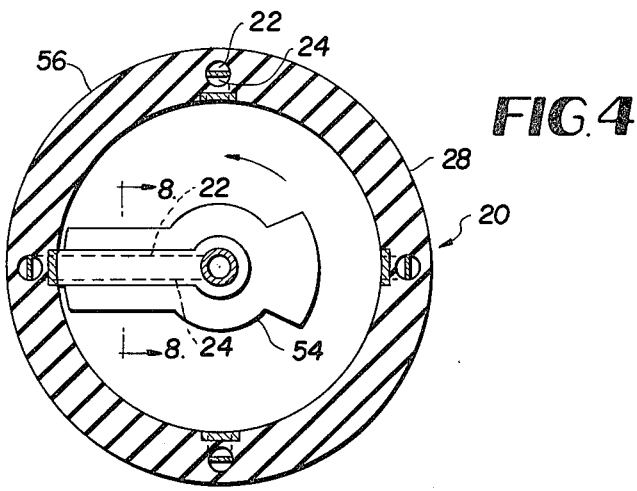
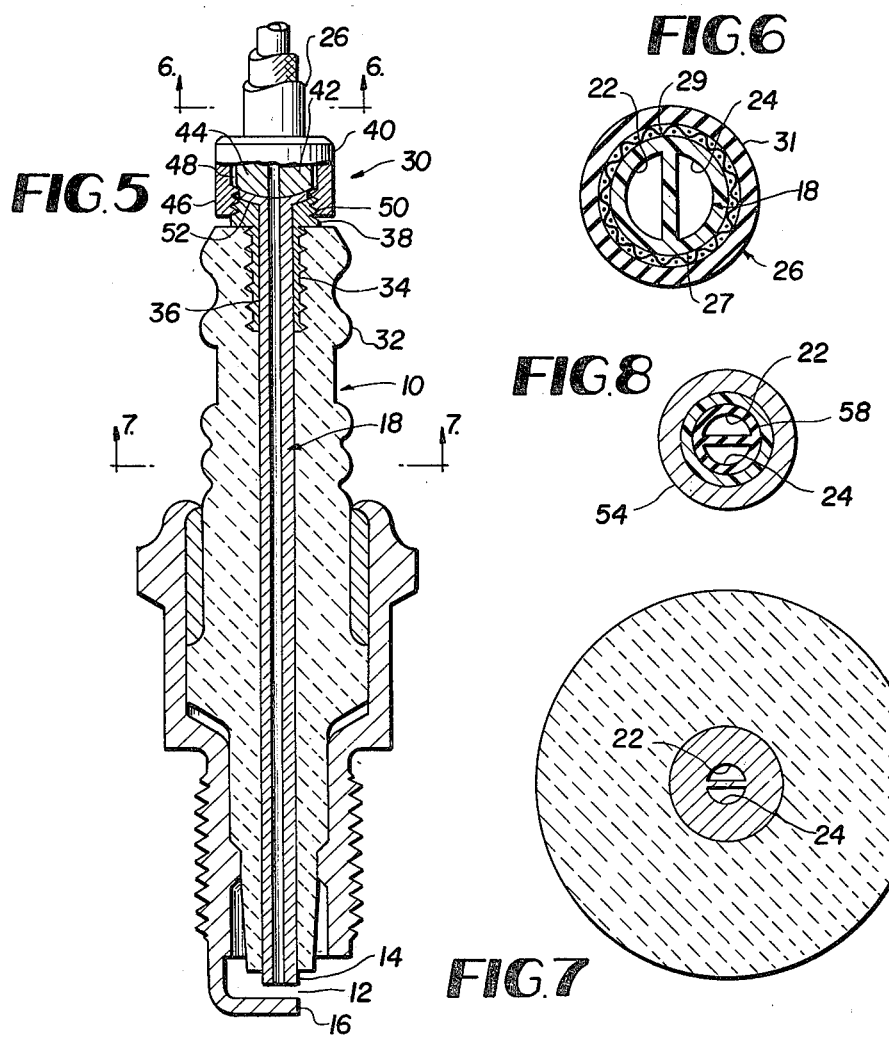

DEVICES FOR SUPPLEMENTING CONVENTIONAL LIQUID FUELS IN INTERNAL COMBUSTION ENGINES WITH GASEOUS FUEL SUPPLEMENTS

TECHNICAL FIELD

The invention relates to internal combustion engines. More particularly, it relates to devices for supplementing conventional liquid or gaseous hydrocarbon fuels in internal combustion engines with gaseous fuel supplements.

BACKGROUND OF THE INVENTION

It is well known that the combustion and thermal efficiencies of internal combustion engines which use hydrocarbons such as diesel or gasoline as their principal fuel can be significantly increased by the introduction of small amounts of gaseous hydrogen into the ignition/combustion chamber as a fuel supplement. Moreover, it is also well known that gaseous hydrogen will reduce or alter some of the major pollutants present in the exhaust of gasoline-powered internal combustion engines, thereby decreasing their environmental impact.

However, gaseous hydrogen from conventional sources is extremely volatile and costly, and in practice it has been found impractical to provide the necessary amount of gaseous hydrogen from onboard storage tanks.

Although this invention is described in the context of hydrogen or hydrogen and oxygen supplementation of gasoline in an otherwise conventional internal combustion engine, in principle the main fuel and/or fuel supplement could also be (1) any liquid fuel, such as gasoline, alcohol, diesel, liquid propane, natural gas, or any combination of such liquid fuels; (2) any slurry or suspension, such as powdered coal; or (3) any mixture of gases, including any mixture of gases dissolved in or suspended in any liquid, suspension, or fluid fuel.

OBJECTS OF THE INVENTION

It is, therefore, a principal object of this invention to provide devices which will positively ensure the presence of a fuel supplement in the ignition/combustion chambers of internal combustion engines, thereby increasing the fuel utilization efficiency of the engines.

It is another principal object of this invention to provide a device which will positively introduce gaseous hydrogen into the fuel chamber of an internal combustion engine during or after ignition, at such a time that the gaseous hydrogen will react with the principal fuel or fuel residues to reduce some of the pollutants present in the combustion by-products.

It is still another object of this invention to provide such devices which are simple to manufacture and sturdy in use.

Other objects and advantages of this invention will become apparent from the detailed description of four preferred embodiments thereof given below.

BRIEF SUMMARY OF THE INVENTION

The invention may be understood in broad outline with reference to FIGS. 1 through 3. The device shown schematically in FIG. 1 and in more detail in FIGS. 4 through 8 comprises means for introducing one (or more) gaseous fuel supplements (e.g., a stream of hydrogen and oxygen gas) into the synchronizer for the ignition power source and means for transmitting the gaseous fuel supplements from the synchronizer to the spark gap in the ignition/combustion chamber. The devices shown schematically in FIG. 2 and in more detail in FIGS. 12 through 15 comprise means for introducing a gaseous fuel supplement consisting of gaseous hydrogen into the carburetor, where it is intimately mixed with vaporized gasoline and air, after which the mixture is transmitted to the combustion chamber in conventional fashion. The device shown schematically in FIG. 3 and in more detail in FIGS. 9 through 11 comprises means for introducing a gaseous fuel supplement into the combustion chamber via the crank shaft and the piston.

BRIEF DESCRIPTION OF THE DRAWINGS

FIG. 4 is a cross-sectional view of a synchronizer adapted for use in a first embodiment of this invention.

FIG. 5 is a cross-sectional view of a spark plug adapted for use in the first embodiment of this invention.

FIG. 6 is a view along the line 6—6 in FIG. 5.

FIG. 7 is a view along the line 7—7 in FIG. 5.

FIG. 8 is a view along the line 8—8 in FIG. 4.

DETAILED DESCRIPTION OF THE PRESENTLY PREFERRED EMBODIMENTS

First Embodiment

Figure 1:
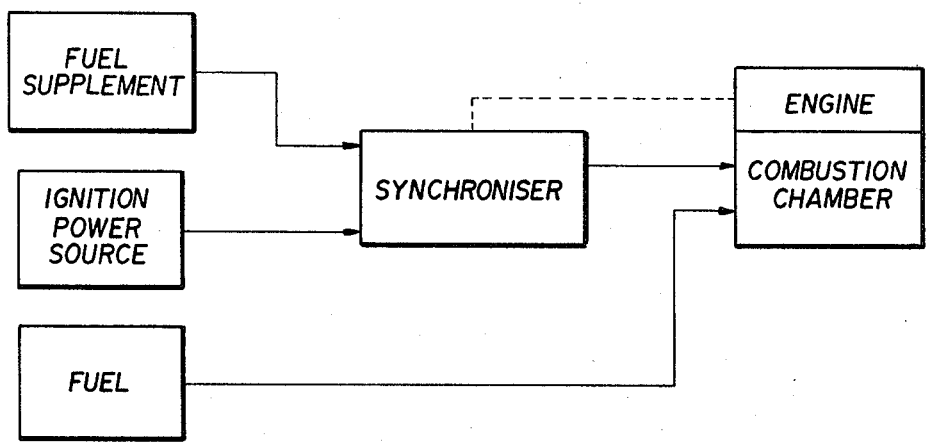
FIG. 1 is a schematic representation of the device depicted in more detail in FIGS. 4 through 8.
Figure 2:
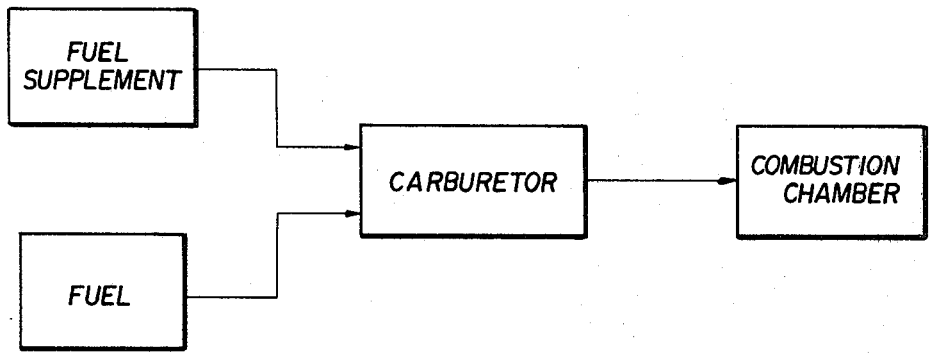
FIG. 2 is a schematic representation both of the device depicted in more detail in FIGS. 12 through 14 and of the device depicted in more detail in FIG. 15.
Figure 3:
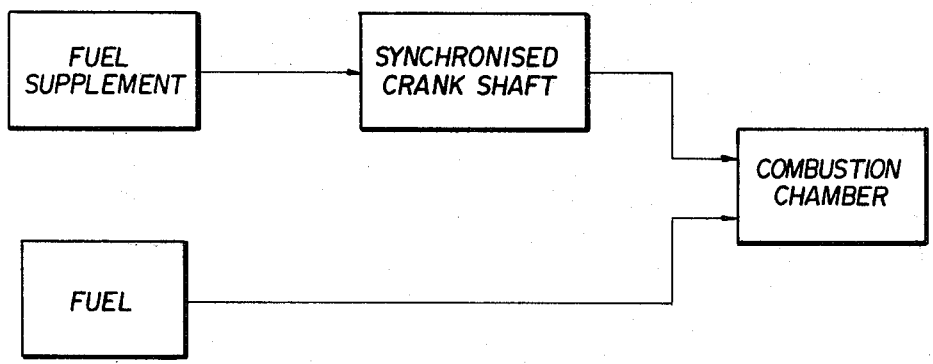
FIG. 3 is a schematic representation of the device depicted in more detail in FIGS. 9 through 11.

The embodiment shown in FIGS. 4 through 8 is adapted for use in an internal combustion engine which uses a principal fuel, such as gasoline, which is introduced into a combustion chamber by conventional means (not shown) in which combustion is produced by a spark plug 10 having a spark gap 12 between two electrodes, 14 and 16. Broadly speaking, this embodiment comprises means 18 for introducing a mixture of hydrogen and oxygen gases into the spark gap 12. In the illustration preferred embodiment, the internal combustion engine also comprises means 20 for causing the introduction of the hydrogen and oxygen gas into the spark gap 12 to be intermittent and in a timed relation to the formation of a spark in the spark gap.

The means 18 comprises conduits 22 and 24 for the hydrogen and oxygen gases extending through at least one of the electrodes 14 and 16. In the illustrated embodiment, the conduits for both gases extend through the electrode 14. This simplifies fabrication of the spark plug 10. However, as will be seen below, it complicates fabrication of the spark plug wire 26 and the commutator 28.

In the preferred embodiment, the conduits 22 and 24 also extend through a spark plug wire 26 leading to the spark plug 10. The spark plug wire 26 preferably comprises an extruded plastic tube 27 containing the conduits 22 and 24 (which may be concentric instead of as shown), a conductive copper sheath 29 wrapped around the plastic tube 27, and a separator or insulator 31 formed around the sheath 29. The spark plug wire 26 is connected to the spark plug 10 by means 30. The spark plug 10 comprises a conventional ceramic body 32 fabricated around a metallic adapter 34 through which the electrode 14 extends. An insulator 36 in the shape of a flared tube is provided to isolate the metallic adapter 34 from the electrode 14. External threads 38 are formed on a portion of the adapter 34 extending outwardly from the ceramic body 32. A cup-shaped collar 40 carried by the spark plug wire 26 comprises an internal conductive portion 42 in electrical contact with the conductor 29 of the spark plug wire 26, an insulator 46, and an external metallic portion 48 having internal threads 50 sized to mate with the external threads 38 on the adapter 34. Accordingly, the collar 46 can be screwed into engagement with the external threads 38, drawing the spark plug 10 and the spark plug wire 26 into a gas-tight seal. Detent means of any appropriate type (not shown) are provided to insure registry between the conduits 22 and 24 in the spark plug 10 and the spark plug wire 26. As will be appreciated, it would be possible to reverse the male and female parts in the means 30—that is, to provide the internal threads in the spark plug 10 and to provide the external threads on the spark plug wire 26.

Preferably the end 52 of the electrode 14 which interfaces with the conductor 44 is flared to provide the maximum possible contact with the conductor 44 consistent with the need to prevent leakage of current from the flared end 52 to the external metallic portion 48 of the collar 40. Moreover, one of the two interfacing surfaces is preferably convex and the other correspondingly concave.

The means 20 comprises conduits 22 and 24 for the hydrogen and oxygen gases extending through the commutator 28. As best seen in FIGS. 4 and 8, the conduits 22 and 24 in the commutator rotor 54 are arranged so that each registers with a corresponding conduit in the commutator stator 56 at each register point and does not register with the other conduit in the commutator stator 56. The conduits 22 and 24 in the commutator rotor 54 are contained within conductor 58. The conduits 22 and 24 in the commutator stator 56 are contained within conductors (not shown) which connect to spark plug wires 26 in conventional fashion (also not shown).

As will be appreciated, electromotive force (EMF) from the commutator rotor 54 and the hydrogen and oxygen gases are delivered to the corresponding conductors and conduits in the commutator stator 56 in a timed manner which is unique for each gas ($H_2/O_2$) and each gas-fuel combination. Since the EMF moves through the conductors in the commutator stator 56, the spark plug wire 26, and the electrode 14 much faster than the hydrogen and oxygen gases move through the corresponding conduits, means must be provided to avoid the generation of a spark in the spark gap 12 before the hydrogen and oxygen gases reach the spark gap 12. The EMF and the gases can be timed to reach the spark gap 12 concurrently by one of several methods.

A. The spark plug 10 can be a capacitor type, the capacitor being chosen such that is accumulates over a time period just long enough to permit the arrival of the gases. The arcing potential of the spark plug is determined by two parameters, the EMF accumulated on the capacitor of the spark plug and the distance, or gap, between the electrodes in the plug. A capacitor-type spark plug can be designed any of several ways. First, the capacitor function of the spark plug can be achieved by simply selecting the proper metals or insulators in the spark plug. Second, one or both of the electrodes themselves can be flexible or mobile, so that the pressure of the gas arriving at the electrode(s) (the wave front of the gas) distorts or moves the electrode(s) in such a manner as to "close the gap"—i.e., the electrodes approach each other and, as the distance decreases, the arc is initiated. This is similar to a classic mercury contact. Third, the $H_2$ gas itself with be slightly charged by its passage through the spark plug wire, and this small increment of EMF in the gas can be used to trigger the discharge of the capacitor.

B. The rotor gas ports can be designed to allow the gas pressure to launch a volume of gas through the wire several milliseconds before the EMF is initiated in the wire to the spark plug.

C. The gas which arrives at the spark plug gap can be initiated by the previous engine cylinder cycle or the previous firing of a different cylinder. In diesel engines especially, there may be two or more pulse volumes of $H_2$ and/or $O_2$ arriving in the cylinder and evan a secondary spark plug in addition to the glow plug.

Second Embodiment

This embodiment delivers any gaseous fuel or fuel supplement directly to the combustion chamber at one or more selected points in the combustion cycle. In the illustrated embodiment, the gaseous fuel supplement is delivered to the combustion chamber at the points of maximum and minimum compression. However, it is within the contemplation of this invention to deliver the gaseous fuel supplement to the combustion chamber at other points during the engine cycle.

The gaseous fuel supplement delivered to the combustion chamber at the point of maximum compression increases the percentage of the principal fuel, such as gasoline, which is actually oxidized. The gaseous fuel supplement, such as hydrogen or oxygen, delivered to the combustion chamber at the point of minimum compression combines with fuel residues, particulates, and pollutants in the exhaust materials to increase combustion of fuel residues and/or alter the chemical nature of the exhaust materials prior to their expulsion from the combustion chamber.

The addition of either hydrogen or oxygen to the combustion chamber during combustion will mix, disperse, and oxidize those heavier fuel particles which did not ignite when the first phase of ignition ocurred. Normal ignition ignites gasoline vapors which are hydrocarbon molecules that are $C_3$ to $C_{30}$ in length, but gasoline liquids and vapors which are $C_{30}$ to $C_{50}$ in length are not fully burned. The admission of the extra hydrogen and oxygen permits ignition of the heavier gasoline liquids and vapors. That is, $C-C-C_{10}-C_{10}-C-C+H_2 \rightarrow HC-C-C_{10}+HC_{10}-C-C$, and the $HC_{10}-C-C$ is oxidized (burned) by the oxygen. Alternatively, $C_{10}-C-$ C-C$_{10}$-C-C+H$_2$ or O$_2$→2C$_{10}$-C-C-OH and/or 2C$_{10}$-C-C-O, both of which are readily burned.

Additionally, the extra hydrogen and oxygen facilitates combustion of other components in the principal fuel (e.g., alcohols, benzene moieties, and ketones). In particular, in the presence of H$_2$, SO$_3$ becomes SO$_2$, or it may form H$_2$SO$_4$ if excess water is present. Similarly, NO$_2$ becomes NO, or it may form HNO$_2$ if excess water is present. In both cases, the reduction/alteration of the emissions alters their toxicity.

If the supplemental H$_2$/O$_2$ is added just prior to exhaust, at which point no more combustion is occurring, but intense heat remains in the cylinder, C$_{10}$-C-C-C$_{10}$+H$_2$→2C$_{10}$-CH, and C$_{10}$-HCH-HCH-C$_{10}$+O$_2$→2C$_{10}$-C-O or 2C$_{10}$-COH. Any C≡C or C=O bond is broken by the H$_2$:C=C+H$_2$→HC-CH or C=O+H$_2$→HC-OH. Similarly, C≡N+H$_2$+O$_2$→HC+HNO$_x$ or COH+NO$_x$; C=S+H$_2$+O$_2$→SO$_x$+COH. The same rationale applies to the SO$_x$ and NO$_x$ emissions; that is, they are reduced or altered.

Of course, what has been said of gasoline in the foregoing is equally true of any hydrocarbon fuel—e.g., diesel oil, gasahol, biogas, etc. In each case, the introduction of small amounts of H$_2$ and O$_2$ to the combustion chambers during the ignition/combustion promotes combustion, and the introduction of small amounts of H$_2$ and O$_2$ to the combustion chamber just prior to exhaust alters the character of the emissions from the exhaust. Additionally, the addition of the volatile H$_2$ and O$_2$ to the combustion chambers during combustion disperses the vaporized principal fuel and intensifies its vaporization; the energy of the basic 2H$_2$+O$_2$→2H$_2$O reaction is added to the energy produced by the combustion of the principal fuel; and the presence of some water in the combustion chamber both increases fuel efficiency and reduces/alters emissions.

Figure 9:
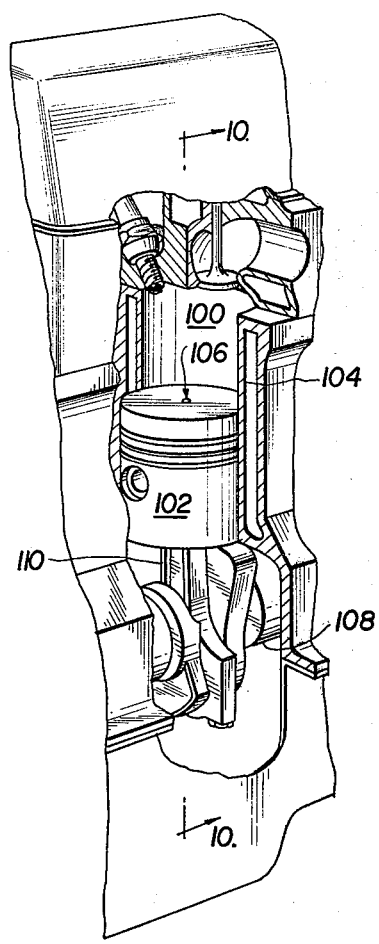
FIG. 9 is a perspective view, partly broken away and partly in section, of a second embodiment of this invention.
Figure 10:
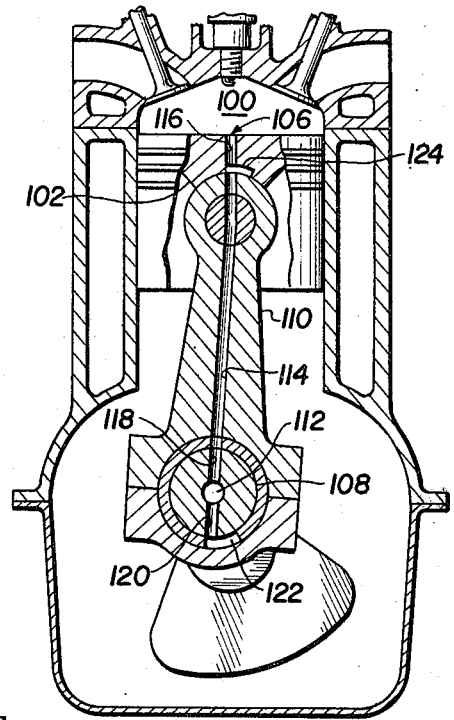
FIG. 10 is a view along the line 10—10 in FIG. 9 with the piston at or near top dead center.
Figure 11:
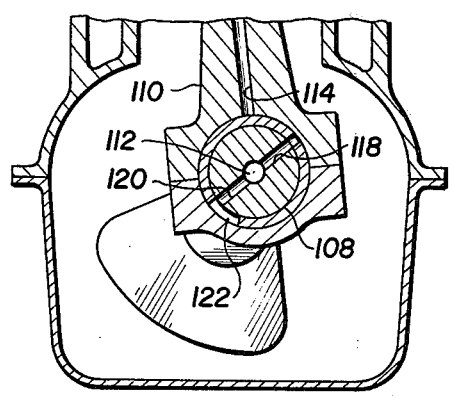
FIG. 11 is a view similar to the bottom portion of FIG. 10 with the piston beyond top dead center.

The embodiment shown in FIGS. 9 and 11 is adapted for use with a principal fuel combustion of which takes places in a combustion chamber 100 defined by a piston 102 in a cylinder 104. The environment of this invention is depicted in FIG. 9, and it will be recognized as completely conventional except for the means 106 for introducing a gaseous fuel or fuel supplement into the combustion chamber 100 through the piston 102. The piston 102 is connected to a crank shaft 108 by a connecting rod 110, and the means 106 comprises connecting axial conduits 112, 114, and 116 through the crank shaft 108, the connecting rod 110, and the piston 102, respectively, as shown in FIG. 10.

As is conventional, the crank shaft 108 rotates relative to the connecting rod 110, and the connecting rod 110 pivots relative to the piston 102. This is illustrated by FIGS. 10 and 11, the former of which shows the piston 102 at top dead center and the connecting rod 110 essentially vertical, and the latter of which shows the connecting rod 110 pivoted from the vertical. Advantage is taken of this conventional feature to provide means 118, 120 for causing the introduction of gaseous fuel or fuel supplement into the combustion chamber 100 to be intermittent and in some timed function related to the combustion of the principal fuel in the combustion chamber 100.

As shown in FIGS. 10 and 11, the means 118, 120 are radial conduits in the crank shaft 108 which are in permanent communication with the axial conduit 112 in the crank shaft 108 but each of which is sized and positioned so that it is in register with the axial conduit 114 in the connecting rod 110 only once during each revolution of the crank shaft 108. In the illustrated embodiment, the radial conduit 118 is sized and positioned so that it is in register with the axial conduit 114 just prior to the point of maximum compression in the combustion chamber 100. However, other relationships are contemplated in which the gaseous fuel supplements are admitted to the cylinder at any phase of cylinder operation—i.e., prior to or during compression, prior to or during ignition, etc. The radial conduit 120 is sized and positioned so that it is in register with the axial conduit 114 just prior to the point of minimum compression in the combustion chamber 100.

The reason that conduits 118 and 120 are sized and positioned so that they are in register "just prior" to the points of maximum and minimum compression, respectively, rather than "at" the points of maximum and minimum compression, is that the gaseous fuel or fuel supplement requires time to travel the length of axial conduits 114 and 116, and the amount by which the registry is advanced is calculated to allow the hydrogen to arrive in the combustion chamber 100 at the points of maximum and minimum compression when the engine is operating. However, the conduits may be selected to register and deliver the gas supplement at any other phase of engine cyclical operation.

The axial conduit 114 in the connecting rod is in registry with the axial conduit 116 in the piston 102 twice during each stroke. As will also be appreciated, the size and positioning of the axial conduit 116 can be calculated so that the axial conduits 114 and 116 are in registry just sufficiently long enough after the radial conduits 118, 120 are in register with the axial conduit 114 so that the gaseous fuel or fuel supplement will have had time to travel the length of the axial conduit 114.

If it is desired to increase the interval during which the gaseous fuel or fuel supplement is delivered to the combustion chamber, it is possible to provide circumferential grooves in communication with the conduits, thereby increasing the length of time in which the conduits are in communication. For instance, circumferential grooves 122 in the crank shaft 108 and corresponding circumferential groove 124 in the piston 102 permits more gaseous fuel or fuel supplement to be delivered to the combustion chamber at and slightly before its point of minimum compression than is delivered to the combustion chamber at its point of maximum compression.

Thus, by maintaining the gaseous fuel or fuel supplement in the axial conduit 112 at a moderate pressure (e.g., 18 p.s.i.a.), it is possible to insure that gaseous fuel or fuel supplement is delivered to the combustion chamber at preselected volumes and intervals during the combustion cycle.

Although not illustrated, in principal it would be possible to introduce two or more gaseous fuel or fuel supplements into the combustion chamber through parallel systems of conduit in the crank shaft, connecting rod, and piston and to allow variations in timing of the rod/piston/shaft orifices to permit the fuel or fuel supplement to enter the cylinder at any time during the cylinder cycle.

Third Embodiment

Figure 12:
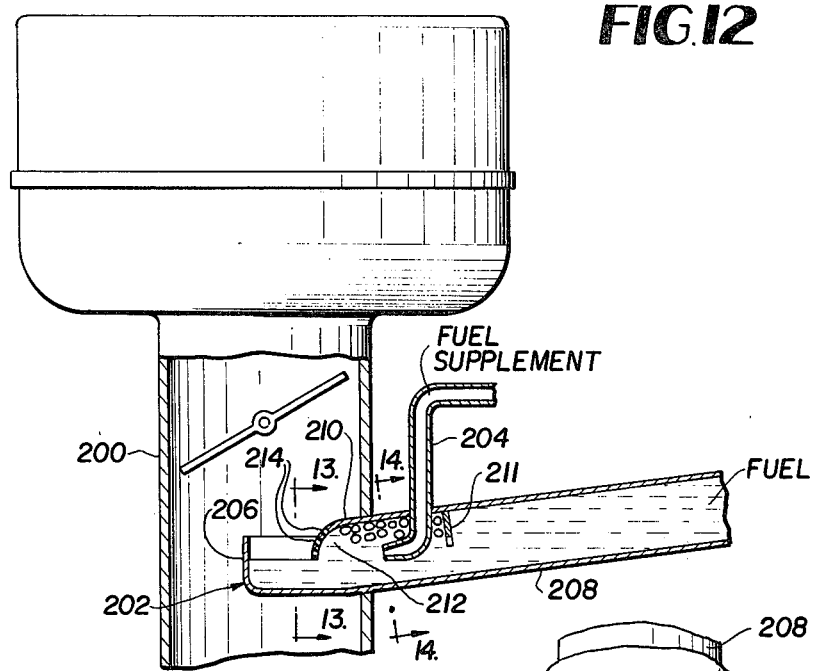
FIG. 12 is a partly cross-sectional view of a third embodiment of this invention.
Figure 14:
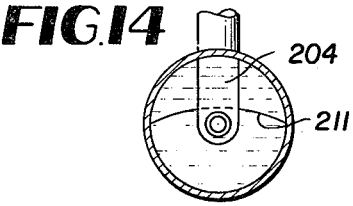
FIG. 14 is a view along the line 14—14 in FIG. 12.
Figure 13:
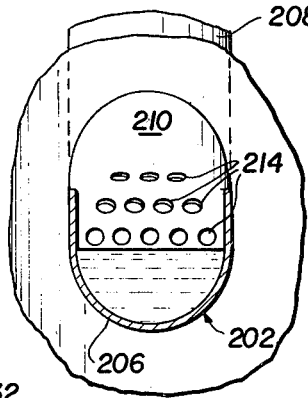
FIG. 13 is a view along the line 13—13 in FIG. 12.

The embodiment shown in FIGS. 12 through 14 is a carburetor adapted for use with a liquid principal fuel. As is conventional, the carburetor comprises a venturi 200 and an injector means 202 for the principal fuel extending into the venturi 200. Additionally, however, means 204 are provided for injecting a gaseous fuel supplement, such as hydrogen, into the injector means 202.

In this embodiment, the U-tube manometer principle is applied. The injector means 202 comprises a cup-shaped container 206 for the principal fuel located in the venturi 200 and a fuel line 208 leading to the container 206. The container 206 has a top 210 over part of its surface. The top 210 and a hemi-cylindrical wall 211 extend down into the container 206 to create an enclosed volume 212 within the container 206. The means 204 is a conduit sized and shaped so as to introduce the gaseous fuel supplement into the enclosed volume 212, and the top 210 contains perforations 214. Although the illustrated means 204 contains a single conduit, in principal it could contain multiple conduits for a plurality of gaseous fuel supplements—as, for instance, one for oxygen and one for hydrogen. Similarly, the conduit 204 might enter the fuel line 208 from the bottom.

The pressure of the gas(es) is predetermined and is set about equal to the volume times the specific gravity of the principal fuel in the section containing the mobile liquid volume. The gas supplement is very small, and the pressure, volume, and temperature relations are designed to produce only a small amount of gas in the enclosed volume 212 during each cycle. Similarly, the size of the top 210 and the number, location, and size of the perforations 214 are dependent upon the nature of the gas supplement and of the principal fuel.

The gaseous fuel supplement is normally prevented from moving upstream against the motion of the liquid principal fuel by the hydrostatic and hydrodynamic pressure of the liquid principal fuel and the hemicylindrical wall 211 in the top of the fuel line 208. Similarly, the gaseous fuel supplement is normally prevented from moving out through the perforations 214 by the hydrostatic pressure of the liquid principal fuel in the remainder of the container 206. However, after the principal fuel in the container 206 is vaporized/atomized, the gaseous fuel supplement is permitted to pass through the perforations 214, after which it mixes intimately with the vaporized liquid principal fuel in the venturi 200.

Fourth Embodiment

Figure 15:
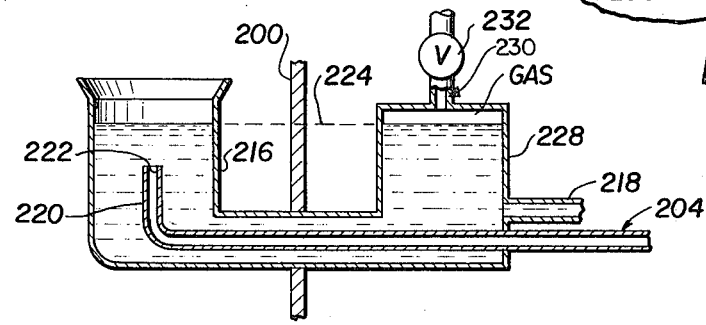
FIG. 15 is a cross-sectional view of a fourth embodiment of this invention.

The embodiment shown in FIG. 15 is a sub-assembly which can be used to replace the sub-assembly 202–214 in FIGS. 12–14. It comprises a cup-shaped container 216 for the liquid principal fuel located in the venturi 200 and a fuel line 218 leading to the container 216. In this embodiment, the means 204 comprises a conduit 220 for the gaseous fuel supplement projecting into the container 216 and ending in an upwardly open orifice 222 located beneath the hydrostatically determined rest level 224 of the liquid principal fuel. Accordingly, the gaseous fuel supplement is largely restricted within the conduit 220 by the hydrostatic pressure of the liquid fuel (e.g., heavy diesel) when the orifice 222 is covered by the liquid principal fuel, although the gas, at low pressure, dissolves in the liquid column to some extent. After the liquid principal fuel in the container 216 has been partly vaporized, additional gas is released from conduit 222 because of the reduction of liquid pressure. As with the previous embodiment, the gaseous fuel supplement then mixes intimately with the vaporized liquid principal fuel in the venturi 200.

The rest level 224 of the liquid principal fuel in the container 216 is determined by an enclosed reservoir 228 for the liquid principal fuel, the upper level of which determines the rest level 224 of the liquid in the container 216. The relationship between the container 216 and the reservoir 228 is essentially that of a U-manometer. The height/dimensions of both "arms" of the "manometer" are specially designed for each gas-liquid pair.

Preferably the gas pressure in the reservoir 228 above the principal fuel is adjustable by means of a conduit 230 containing a valve 232. The conduit 230 can be connected to the carburetor or it can be connected to a small pump which supplies compressed air and/or vacuum to the reservoir 228. The specific design of the pump, the conduit 230, and the valve 232 would, of course, be a function of the principal fuel and the fuel supplement used.

Caveat

While the present invention has been illustrated by detailed descriptions of four preferred embodiments thereof, it will be obvious to those skilled in the art that various changes in form and detail can be made therein without departing from the true scope of the invetion. For that reason, the invention must be measured by the claims appended hereto and not by the foregoing preferred embodiments.

I claim:

1. In a spark plug having a spark gap between two electrodes, the improvement comprising:
    (a) first means for introducing a mixture of gases into said spark gap, said first means comprising a plurality of conduits which extend through one of said electrodes, and
    (b) second means for connecting said spark plug to a spark plug wire which likewise contains a plurality of conduits for the gases, said second means comprising:
        (i) external threads on one of said spark plugs and the spark plug wire,
        (ii) a cup-shaped collar carried by the other of said spark plug and the spark plug wire, said cup-shaped collar having internal threads sized to mate with said external threads,
        (iii) one of the interfacing surfaces of said spark plug and the spark plug wire being convex and the other being correspondingly concave, and
        (iv) the surface of the conductor in said spark plug being flared to provide the maximum possible contact with the interfacing surface of the conductor in spark plug wire.

2. In a spark plug as recited in claim 1, the further improvement wherein said gases are hydrogen and oxygen.

* * * * *